United States Patent Office 3,342,884
Patented Sept. 19, 1967

3,342,884
NOVEL CYCLOHEXYL DERIVATIVES OF ETHYLENE AND METHODS FOR THEIR PREPARATION
Paul W. Solomon, Bartlesville, Okla., assignor to Phillips Petroleum Company, a corporation of Delaware
No Drawing. Filed Nov. 18, 1965, Ser. No. 508,573
3 Claims. (Cl. 260—666)

ABSTRACT OF THE DISCLOSURE 1,2-bis(3-cyclohexen-1-yl)ethylenes are selectively hydrogenated as to the cyclohexene double bonds using a hydrogenation catalyst such as platinum.

---

This invention relates to the selective hydrogenation of 1,2-bis(3-cyclohexen-1-yl)ethylenes to 1,2-dicyclohexylethylenes and 1-cyclohexyl-2-(3-cyclohexen-1-yl)ethylenes. In one aspect this invention relates to novel cyclohexyl derivatives of ethylene. In another aspect this invention relates to the selective hydrogenation of 1,2-bis(3-cyclohexen-1-yl)ethylene.

In accordance with this invention 1,2-dicyclohexylethylenes having the formula

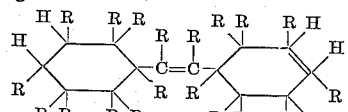

and 1-cyclohexyl-2-(3-cyclohexen-1-yl)ethylenes having the formula

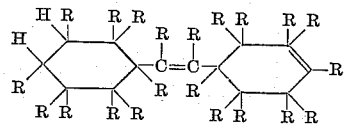

are produced by partial hydrogenation of 1,2-bis(3-cyclohexen-1-yl)ethylenes having the formula

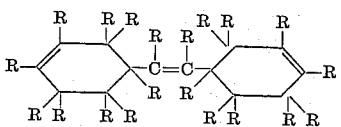

where R is selected from the group consisting of hydrogen, methyl and ethyl, the total number of carbon atoms in all of said alkyl radicals preferably not exceeding 8, in the presence of a suitable hydrogenation catalyst.

It is to be understood that the ethylenic groups, i.e.

in these products retain their original geometric configuration present in the starting triolefin. For example, the partial hydrogenation of trans-1,2-bis(3-cyclohexen-1-yl)ethylene gives trans-1,2-dicyclohexylethylene and trans-1-cyclohexyl-2-(3-cyclohexen-1-yl)ethylene, and the partial hydrogenation of cis - 1,2-bis(3-cyclohexen-1-yl)ethylene gives cis-1,2-dicyclohexylethylene and cis-1-cyclohexyl-2-(3-cyclohexen-1-yl)ethylene.

The novel starting material useful in the practice of this invention is described in a copending application (Ser. No. 502,544, filed Oct. 22, 1965) of D. L. Crain and assigned to a common assignee, Phillips Petroleum Company of Bartlesville, Okla.

Examples of applicable triolefins having the formula

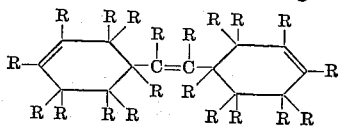

where R is at least one member selected from the group consisting of hydrogen and methyl and ethyl radicals, the total number of carbon atoms in all of said R groups preferably being not greater than 8:

1,2-bis(3-cyclohexen-1-yl)ethylene
1,2-bis(1-methyl-3-cyclohexen-1-yl)ethylene
1,2-bis(2-methyl-3-cyclohexen-1-yl)ethylene
1,2-bis(3-ethyl-3-cyclohexen-1-yl)ethylene
1,2-bis(4-methyl-3-cyclohexen-1-yl)ethylene
1,2-bis(5-ethyl-3-cyclohexen-1-yl)ethylene
1,2-bis(6,6-dimethyl-3-cyclohexen-1-yl)ethylene
3,4-bis(3-cyclohexen-1-yl)-3-hexene
1,2-bis(2,6-dimethyl-3-cyclohexen-1-yl)ethylene
2,3-bis(3-methyl-3-cyclohexen-1-yl)-2-butene
1,2-bis(1,3-dimethyl-3-cyclohexen-1-yl)ethylene
2,3-bis(4-methyl-3-cyclohexen-1-yl)-2-butene
1,2-bis(1,4-dimethyl-3-cyclohexen-1-yl)ethylene
1,2-bis(5,6-dimethyl-3-cyclohexen-1-yl)ethylene
2,3-bis(1,3,4-trimethyl-3-cyclohexen-1-yl)-2-butene
1,2-bis(2,5,6-trimethyl-3-cyclohexen-1-yl)ethylene
1,2-bis(2,6-diethyl-3-cyclohexen-1-yl)ethylene
3,4-bis(4-ethyl-3-cyclohexen-1-yl)-3-hexene
1-(3-methyl-3-cyclohexen-1-yl)-2-(2-methyl-6-ethyl-3-cyclohexen-1-yl)ethylene
1-(3-cyclohexen-1-yl)-2-(2-methyl-3-cyclohexen-1-yl)ethylene Hydrogenation catalysts which are suitable in the practice of this invention comprise elemental ruthenium, rhodium, palladium, osmium, iridium, and platinum, said catalyst being prepared by reduction of a salt of the corresponding metal by treatment of said salt with sodium borohydride. Preferably, said catalyst is supported on a substance such as elemental carbon or other suitable support. The catalyst of choice is elemental platinum supported on carbon. The preparation of the preferred supported catalysts for use in this invention is described in an article by Brown and Brown, J. Am. Chem. Soc., 84, 2827 (1962) and in a brochure, "Operating Directions for the Brown [2] Hydrogenator," Delmar Scientific Laboratories, 317 Madison Street, Maywood, Ill. The preparation of suitable unsupported catalysts is described by Brown and Brown in J. Am. Chem. Soc., 84, 1494 (1962).

The amount of hydrogen employed in the selective hydrogenation process of this invention can vary considerably, depending in part on whether the product most desired is the monoolefin or the diolefin. When the diolefin is the product most desired, the hydrogen usually will be employed in an amount of about 0.5-1.5 mols per mol of starting triolefin material employed. When the monoolefin is the product most desired, the hydrogen usually will be employed in an amount of about 1-2.2 mols per mol of triolefin used.

The temperature at which the hydrogenation is carried out can vary over a considerable range. It is generally preferred that the temperature be maintained within the range of about 0–100° C., usually being maintained within the range of about 20–50° C. The hydrogenation pressure is conveniently maintained at approximately atmospheric; however, lower or higher pressures, e.g., up to about 200 p.s.i.g. or more, can be employed.

The hydrogenation of the triolefin can be carried out in the absence of a solvent; however, it is within the scope of the invention that a solvent, such as an alcohol, which does not deleteriously react with any of the components of the system, can be employed. Ethanol is preferably used as a solvent as it can serve as a solvent for the sodium borohydride used in the in situ preparation of the catalyst. It is also to be noted that when the catalyst is prepared in situ there can be present water and any organic or mineral acid previously used in the in situ preparation of the catalyst.

Products [1 - cyclohexyl-2-(3-cyclohexen-1-yl)ethylenes] having the formula

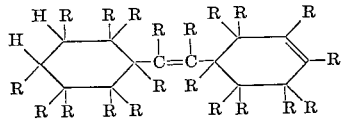

where R is as defined for starting triolefin;

1-cyclohexyl-2-(3-cyclohexen-1-yl)ethylene
1-(1-methylcyclohexyl)-2-(1-methyl-3-cyclohexen-1-yl) ethylene
1-(2-methylcyclohexyl)-2-(2-methyl-3-cyclohexen-1-yl) ethylene
1-(3-ethylcyclohexyl)-2-(3-ethyl-3-cyclohexen-1-yl)ethylene
1-(4-methylcyclohexyl)-2-(4-methyl-3-cyclohexen-1-yl) ethylene
1-(3-ethylcyclohexyl)-2-(5-ethyl-3-cyclohexen-1-yl)ethylene
1-(2,2-dimethylcyclohexyl)-2-(6,6-dimethyl-3-cyclohexen-1-yl)ethylene
3-cyclohexyl-4-(3-cyclohexen-1-yl)-3-hexene
1-(2,6-dimethylcyclohexyl)-2-(2,6-dimethyl-3-cyclohexen-1-yl)ethylene
2-(3-methylcyclohexyl)-3-(3-methyl-3-cyclohexen-1-yl)-2-butene
1-(1,3-dimethylcyclohexyl)-2-(1,3-dimethyl-3-cyclohexen-1-yl)ethylene
2-(4-methylcyclohexyl)-3-(4-methyl-3-cyclohexen-1-yl)-2-butene
1-(1,4-dimethylcyclohexyl)-2-(1,4-dimethyl-3-cyclohexen-1-yl)ethylene
1-(2,3-dimethylcyclohexyl)-2-(5,6-dimethyl-3-cyclohexen-1-yl)ethylene
2-(1,3,4-trimethylcyclohexyl)-3-(1,3,4-trimethyl-3-cyclohexen-1-yl)-2-butene
1-(2,3,6-trimethylcyclohexyl)-2-(2,5,6-trimethyl-3-cyclohexen-1-yl)-ethylene
1-(2,6-diethylcyclohexyl)-2-(2,6-diethyl-3-cyclohexen-1-yl)ethylene
3-(4-ethylcyclohexyl)-4-(4-ethyl-3-cyclohexen-1-yl)-3-hexene
1-(2-methyl-6-ethylcyclohexyl)-2-(3-methyl-3-cyclohexen-1-yl)ethylene
1-cyclohexyl-2-(2-methyl-3-cyclohexen-1-yl)ethylene Products [1,2-dicyclohexylethylenes] having the formula

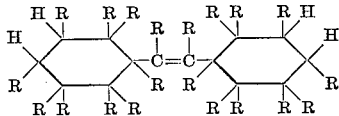

where R is as defined for starting triolefin:

1,2-dicyclohexylethylene
1,2-bis(1-methylcyclohexyl)ethylene
1,2-bis(2-methylcyclohexyl)ethylene
1,2-bis(3-ethylcyclohexyl)ethylene
1,2-bis(4-ethylcyclohexyl)ethylene
1,2-bis(2,2-dimethylcyclohexyl)ethylene
3,4-dicyclohexyl-3-hexene
1,2-bis(2,6-dimethylcyclohexyl)ethylene
2,3-bis(3-methylcyclohexyl)-2-butene
1,2-bis(1,3-dimethylcyclohexyl)ethylene
2,3-bis(4-methylcyclohexyl)-2-butene
1,2-bis(1,4-dimethylcyclohexyl)ethylene
1,2-bis(2,3-dimethylcyclohexyl)ethylene
2,3-bis(1,3,4-trimethylcyclohexyl)-2-butene
1,2-bis(2,3,6-trimethylcyclohexyl)ethylene
1,2-bis(2,6-diethylcyclohexyl)ethylene
3,4-bis(4-ethylcyclohexyl)-3-hexene 1-(3-methylcyclohexyl)-2-(2-methyl-6-ethylcyclohexyl) ethylene
1-cyclohexyl-2-(2-methylcyclohexyl)ethylene The practice of this invention is illustrated in greater detail by the following examples. There are, of course, many forms of the invention other than these specified embodiments, and these examples are to be considered as being illustrative and not as limiting the scope of the invention.

*Example 1*

In this and the following example, the degree of hydrogenation is controlled by varying the amount of sodium borohydride used in the external generation of hydrogen for the hydrogenation. For each example, the carbon-supported catalyst was prepared by adding 25 ml. of 1.0 mol sodium borohydride solution (prepared from 0.8 gram of sodium hydroxide, 10 ml. of water, 200 ml. of absolute ethanol and 7.9 grams of sodium borohydride) to a stirred mixture of 100 ml. of absolute ethanol, 5.0 ml. of 0.2 molar chloroplatinic acid in absolute ethanol, and 5 grams of decolorizing carbon (Darco K–B), followed by the addition of 20 ml. of glacial acetic acid. To the catalyst as prepared were added 300 ml. of absolute ethanol and 47 grams (0.25 mol) of trans-1,2-bis(3-cyclohexen-1-yl)-ethylene which was hydrogenated, with stirring, at approximately atmospheric pressure without external heating or cooling. The hydrogen was produced externally by allowing an aqueous 1.0 M sodium borohydride solution (containing 0.4 weight percent sodium hydroxide) to drop into approximately 40 ml. of stirred glacial acetic acid, the rate of flow of the sodium borohydride solution being governed by the rate of hydrogenation of the triolefin material by the hydrogen passed from the hydrogen generator into the hydrogenator.

Eighty-four ml. of the aqueous 1.0 molar sodium borohydride solution was allowed to drop into the glacial acetic acid over a period of 35 minutes, and the hydrogen generated was passed into the stirred mixture containing the 1-2-bis(3-cyclohexen-1-yl)ethylene and catalyst. The theoretical amount of hydrogen generated from the borohydride was 336 millimoles, an amount which was 45 percent of that which would be required to completely hydrogenate the triolefin. Thus, the calculated amount of hydrogen was 1.35 mols per mol of triolefin. The catalyst was filtered from the partially hydrogenated product, the filtrate was diluted with water, the diluted mixture was extracted with n-pentane, and the n-pentane solution was washed with water and with aqueous sodium bicarbonate.

After removal of most of the n-pentane, and with a correction factor applied for the 3.1 weight percent residual n-pentane, the product was found by gas chromatographic analysis to comprise 2 weight percent 1,2-dicyclohexylethane, 43 weight percent trans-1,2-dicyclohexylethylene, 41 weight percent trans-1-cyclohexyl-2-(3-cyclohexen-1-yl)ethylene, and 11 weight percent unreacted trans-1,2-bis(3-cyclohexen-1-yl)ethylene, each identified with the aid of infrared, nuclear magnetic resonance, and mass spectrometer analysis, and three unidentified components in a total amount of 3 weight percent. The infrared, nuclear magnetic resonance, and mass spectrometer analyses were carried out on the product after removal of the residual n-pentane by flash distillation, the distilled product boiling at 105–109° C./3.0 mm. Hg.

In the infrared analysis the absorbance per micron of cell thickness was determined at 10.35 microns (wavelength characteristic of the trans —CH=CH— group), at 11.85 microns, wavelength characteristic of the cyclohexyl group, and at 15.2 microns, wavelength characteristic of the

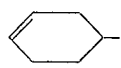

group, the absorbance at these wavelengths, where applicable, having been determined previously for pure trans- 1,2-bis(3-cyclohexen-1-yl)ethylene and pure 1,2-dicyclohexylethane. From these absorbence values calculations showed the product contained 45 mol percent cyclohexyl groups, 20 mol percent cyclohexyl groups, and approximately 30 mol percent trans-ethylene groups, the remainder being ethane and other groups. These values were in good agreement with the values of 45 mol percent cyclohexyl groups, 21 mol percent

groups, and 32 mol percent trans —CH=CH— groups calculated on the basis of the gas chromatographic analysis. Nuclear magnetic resonance analysis showed the proton distribution of the product to be 4.96 percent cyclic olefinic protons, 7.53 percent ethylenic protons, and 87.5 percent other protons, in good agreement with values calculated from the infrared analysis data of 5.4 percent cyclic olefinic protons, 8.0 percent ethylenic protons, and 86.6 percent other protons. Mass spectrometer analysis of each of the components for which structures were assigned showed each of these components to have cracking patterns and molecular weights consistent with those to be expected for a compound of the assigned structure.

*Example II*

The hydrogen generated by dropping 125 ml. of the aqueous 1.0 mol sodium borohydride solution into approximately 40 ml. of stirred glacial acetic acid over a period of 62.5 minutes was passed into the stirred mixture containing 0.25 mol of trans-1,2-bis(3-cyclohexen-1-yl)ethylene and the catalyst prepared as described in Example I. The theoretical amount of hydrogen generated from the borohydride was 500 millimoles, an amount sufficient to hydrogenate two-thirds of the olefinic double bonds. Thus, the calculated amount of hydrogen was 2.00 mols per mol of triolefin. The catalyst was filtered from the partially hydrogenated product, the filtrate was diluted with water, the diluted mixture was extracted with n-pentane, and the n-pentane solution was washed with water and with aqueous sodium bicarbonate. After removal of most of the n-pentane, and with a correction factor applied for the 12 weight percent residual n-pentane, the product was found by gas chromatographic analysis to comprise 15 weight percent 1,2-dicyclohexylethane, 69 weight percent trans-1,2-dicyclohexylethylene, 11 weight percent trans-1-cyclohexyl-2-(3-cyclohexen-1-yl)ethylene, and a trace of unreacted trans-1,2-bis(3-cyclohexen-1-yl)ethylene, each identified with the aid of infrared, nuclear magnetic resonance, and mass spectrometer analysis, and 5 weight percent of unidentified material. The infrared, nuclear magnetic resonance, and mass spectrometer analyses were carried out on the product after removal of the residual n-pentane by flash distillation, the distilled product boiling at 90–93° C./1.0 mm. Hg. In the infrared analysis the absorbance per micron of cell thickness was determined at 10.35 microns (wavelength characteristic of the trans —CH=CH— group), at 11.85 microns, wavelength characteristic of the

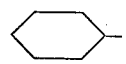

group, and at 15.2 microns, wavelength characteristic of the

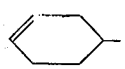

group, the absorbance at these wavelengths, where applicable, having been determined previously for pure-trans-1,2-bis(3-cyclohexen-1-yl)ethylene and pure 1,2-dicyclohexylethane. From these absorbance values calculations showed the product contained 61 mol percent

groups, 5 mol percent

groups, and approximately 28 mol percent trans

—CH=CH— groups, the remainder being —CH$_2$CH$_2$— and other groups. These values were in good agreement with values of 63 mol percent

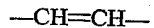

groups, 4 mol percent

groups, and 28 mol percent trans —CH=CH— groups calculated on the basis of the gas chromatographic analysis. Nuclear magnetic resonance analysis showed the proton distribution in the product to be 1.13 percent cyclic olefinic protons, 6.09 percent ethylenic protons, and 92.8 percent other protons, in good agreement with values, calculated from the infrared analysis data, of 1.3 percent cyclic olefinic protons, 7.1 percent ethylenic protons, and 91.6 percent other protons. Mass spectrometer analysis of each of the components for which structures were assigned showed each of these components to have cracking patterns and molecular weights consistent with those to be expected for a compound of the assigned structure.

The unsaturated substances produced by the process of this invention are useful as monomers for the production of polymers and as chemical intermediates.

Obviously, many modifications and variations of the present invention are possible in the light of the above teachings. It is therefore to be understood that within the scope of the appended claims the invention may be practiced otherwise than as specifically described herein.

What is claimed is:

1. A process for producing compounds characterized by the following formulas:

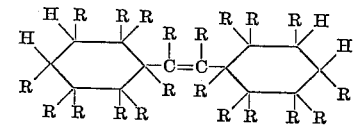

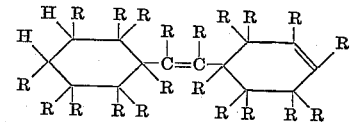

which comprises hydrogenating in contact with a hydrogenation catalyst selected from the group of metals consisting of from ruthenium, rhodium, palladium, osmium, iridium, and platinum, said catalyst being prepared by reduction of a salt of the corresponding metal by treatment of said salt with sodium borohydride, and at a temperature of from about 0° to about 100° C. and a pressure of from substantially atmospheric to about 200 p.s.i.g. a triolefin compound represented by the formula

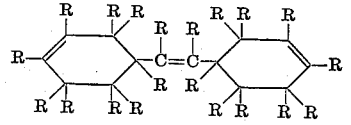

wherein each of said R's is selected from the group consisting of hydrogen, methyl and ethyl, the total number of carbon atoms in all of said R groups not exceeding 8, the amount of hydrogen employed being in the range of 0.5 to 2.2 mols per mol of triolefin.

2. The process defined in claim 1 further characterized in that 1,2-bis(3-cyclohexen-1-yl)ethylene is hydrogenated in contact with a carbon-supported platinum catalyst wherein the amount of hydrogen is maintained in the range of 0.5 to 2.2 mols per mol of 1,2-bis(3-cyclohexen-1-yl)ethylene.

3. The proces defined in claim 2 further characterized in that the hydrogenation is carried out in contact with a solvent which does not deleteriously react with any of the components of the system.

References Cited

UNITED STATES PATENTS

| | | | |
|---|---|---|---|
| 2,360,555 | 10/1944 | Evans et al. | 260—666 |
| 2,576,743 | 11/1951 | Allenby | 260—666 |
| 3,022,359 | 2/1962 | Wiese et al. | 260—666 |
| 3,108,359 | 10/1963 | Reppe et al. | 260—666 |

FOREIGN PATENTS

| | | |
|---|---|---|
| 936,226 | 9/1963 | Great Britain. |

OTHER REFERENCES

Hans Jurgen Bestmann et al.: Chem. Ber., 96, pages 1899–1908, 1963.

H. H. Inhoffen et al.: Chem. Ber. 87, pages 1418–1425, 1954.

H. H. Inhoffen et al.: Chem. Ber. 89, pages 1833–1837, 1956.

H. H. Inhoffen et al.: Chem. Ber., 88, pages 1415–1423, 1955.

Norman L. Allenger et al.: J. Amer. Chem. Soc., 86, pages 2811–2819, 1964.

Von F. Hunziker et al.: Helv. Chem. Acta., 38, pages 1899–1908.

Von M. Viscontini et al.: Helv. Chem. Acta., 40, pages 881–886, 1957.

DELBERT E. GANTZ, *Primary Examiner.*

V. O'KEEFE, *Assistant Examiner.*